US010348572B1

(12) United States Patent
Zheng et al.

(10) Patent No.: US 10,348,572 B1
(45) Date of Patent: Jul. 9, 2019

(54) DYNAMIC BANDWIDTH ALLOCATION FOR WIRELESS MESH NETWORKS

(71) Applicant: Facebook, Inc., Menlo Park, CA (US)

(72) Inventors: Dong Zheng, Saratoga, CA (US); Praveen Kumar Gopala, Sunnyvale, CA (US); Pradeep Jugraj Nemavat, Fremont, CA (US); Adam Joshua Efron, Irvine, CA (US)

(73) Assignee: Facebook, Inc., Menlo Park, CA (US)

( * ) Notice: Subject to any disclaimer, the term of this patent is extended or adjusted under 35 U.S.C. 154(b) by 32 days.

(21) Appl. No.: 15/893,868

(22) Filed: Feb. 12, 2018

Related U.S. Application Data

(60) Provisional application No. 62/619,744, filed on Jan. 20, 2018.

(51) Int. Cl.
*H04W 4/00* (2018.01)
*H04L 12/24* (2006.01)
*H04W 84/18* (2009.01)

(52) U.S. Cl.
CPC ......... *H04L 41/0896* (2013.01); *H04W 84/18* (2013.01)

(58) Field of Classification Search
CPC .................................................. H04L 41/0896
See application file for complete search history.

(56) References Cited

U.S. PATENT DOCUMENTS

| 7,145,867 | B2* | 12/2006 | Aicklen | H04L 45/00 370/228 |
| 7,606,147 | B2* | 10/2009 | Luft | H04L 41/0896 370/229 |
| 8,223,728 | B2 | 7/2012 | Westphal et al. | |
| 8,724,567 | B2 | 5/2014 | Shin et al. | |
| 9,571,402 | B2* | 2/2017 | Kumar | H04L 47/18 |
| 9,914,950 | B2 | 3/2018 | Lazinski et al. | |
| 2005/0201340 | A1 | 9/2005 | Wang et al. | |
| 2009/0046675 | A1* | 2/2009 | Pratt, Jr. | H04W 84/18 370/337 |
| 2012/0039271 | A1 | 2/2012 | Kim et al. | |
| 2014/0269292 | A1* | 9/2014 | Kalkunte | H04L 45/123 370/232 |

(Continued)

*Primary Examiner* — Gerald A Smarth
(74) *Attorney, Agent, or Firm* — Brian R. Short (57) ABSTRACT

Apparatuses, methods, and systems for dynamic bandwidth allocation are disclosed. One method includes identifying, by a first distribution node of a wireless mesh network, a communication link with a second distribution node of the wireless mesh network, generating, by the first distribution node, a proposed bandwidth allocation schedule for wireless communication of information between the first distribution node and the second distribution node based on data traffic requirements of the first distribution node, wherein the second distribution node receives the proposed bandwidth allocation schedule, and wherein the second distribution node adjusts the proposed bandwidth allocation schedule based upon data traffic requirements of the second distribution node. The method further includes receiving, by the first distribution node, the adjusted proposed bandwidth allocation schedule from the second distribution node, and communicating, by the first distribution node, information with the second distribution node according to the adjusted proposed bandwidth allocation schedule.

20 Claims, 9 Drawing Sheets

(56) References Cited

U.S. PATENT DOCUMENTS

| | | |
|---|---|---|
| 2014/0286163 A1 | 9/2014 | Kim |
| 2015/0016253 A1* | 1/2015 | Jaska ...................... H04L 47/22 370/230.1 |
| 2018/0006948 A1* | 1/2018 | Torvi .................. H04L 41/0896 |

* cited by examiner

| Proposed Bandwidth Allocation Schedule 610 | Adjusted Proposed Bandwidth Allocation Schedule 612 | Bandwidth Allocation Schedule with Client Nodes 614 |
|---|---|---|
| D1 -> D2 | D1 -> D2 | D1 -> D2 |
|  |  | D1 -> C2 |
| D1 -> D2 |  | D1 -> C2 |
|  |  | D1 -> C1 |
| D1 -> D2 | D1 -> D2 | D1 -> D2 |
|  |  | D1 -> C2 |
| D1 -> D2 |  | D1 -> C2 |
|  |  | D1 -> C1 |
| D1 -> D2 | D1 -> D2 | D1 -> D2 |
|  |  | D1 -> C2 |
| D1 -> D2 |  | D1 -> C2 |
|  |  | D1 -> C1 |
| D1 -> D2 | D1 -> D2 | D1 -> D2 |
|  |  | D1 -> C2 |
| D1 -> D2 |  | D1 -> C2 |
|  |  | D1 -> C1 |

FIGURE 6

| Adjusted Proposed Bandwidth Allocation Schedule | Adjusted Proposed Bandwidth Allocation Schedule | Final Bandwidth Allocation Schedule at D1 |
|---|---|---|
| Generated by Distribution Node D2 after receiving a Proposed Bandwidth Allocation Schedule which included a 10/16 bit map allocations 710 | Generated by Distribution Node D3 after receiving a Proposed Bandwidth Allocation Schedule which included a 6/16 bit map allocations 720 | Generated by based on the Adjusted Proposed Bandwidth Allocation Schedules Received back from D2 and D3 730 |
| D1 -> D2 | | D1 -> D2 |
| D1 -> D2 | | D1 -> D2 |
| D1 -> D2 | | D1 -> D2 |
| D1 -> D2 | | D1 -> D2 |
| D1 -> D2 | | D1 -> D2 |
| D1 -> D2 | | D1 -> D2 |
| D1 -> D2 | | D1 -> D2 |
| D1 -> D2 | | D1 -> D2 |
| D1 -> D2 | | D1 -> D2 |
| D1 -> D2 | | D1 -> D2 |
| | D1 -> D3 | D1 -> D3 |
| | D1 -> D3 | D1 -> D3 |
| | D1 -> D3 | D1 -> D3 |
| | D1 -> D3 | D1 -> D3 |
| | D1 -> D3 | D1 -> D3 |
| | D1 -> D3 | D1 -> D3 |

FIGURE 7

Adjusted Proposed Bandwidth
Allocation Schedules Generated by Distribution Node 2
for Proposed Bandwidth Allocation Schedules having Increasing Percentages Adjusted Proposed Bandwidth
Allocation Schedules Generated by Distribution Node 3
for Proposed Bandwidth Allocation Schedules having Increasing Percentages

DYNAMIC BANDWIDTH ALLOCATION FOR WIRELESS MESH NETWORKS

RELATED APPLICATIONS

This patent application claims priority to U.S. Provisional Patent Application Ser. No. 62/619,744 filed Jan. 20, 2018, which is herein incorporated by reference.

FIELD OF THE DESCRIBED EMBODIMENTS

The described embodiments relate generally to wireless communications. More particularly, the described embodiments relate to systems, methods and apparatuses for dynamic bandwidth allocation for wireless mesh networks.

BACKGROUND

Multi-hop wireless networks include multiple nodes wherein wireless links are formed between the nodes. Efficient usage of the bandwidth of wireless links between the nodes is needed for high performance of multi-hop wireless networks.

It is desirable to have methods apparatuses, and systems for dynamic bandwidth allocation for wireless mesh networks.

SUMMARY

An embodiment includes a method of dynamic bandwidth allocation. The method includes identifying, by a first distribution node of a wireless mesh network, a communication link with a second distribution node of the wireless mesh network, generating, by the first distribution node, a proposed bandwidth allocation schedule for wireless communication of information between the first distribution node and the second distribution node based on data traffic requirements of the first distribution node, wherein the second distribution node receives the proposed bandwidth allocation schedule, and wherein the second distribution node adjusts the proposed bandwidth allocation schedule based upon data traffic requirements of the second distribution node. The method further includes receiving, by the first distribution node, the adjusted proposed bandwidth allocation schedule from the second distribution node, and communicating, by the first distribution node, information with the second distribution node according to the adjusted proposed bandwidth allocation schedule.

Another embodiment includes a wireless network. The wireless network includes a first distribution node and a second distribution node. The first distribution node operates to identify a communication link with the second distribution node, and generate a proposed bandwidth allocation schedule for wireless communication of information between the first distribution node and the second distribution node based on data traffic requirements of the first distribution node. The second distribution node operates to receive the proposed bandwidth allocation schedule, and adjust the proposed bandwidth allocation schedule based upon data traffic requirements of the second distribution node. The first distribution node further operates to receive the adjusted proposed bandwidth allocation schedule from the second distribution node, and communicate information with the second distribution node according to the adjusted proposed bandwidth allocation schedule.

Another embodiment includes a first distribution node. The first distribution node operates to identify a communication link with a second distribution node of a wireless mesh network, and generate a proposed bandwidth allocation schedule for wireless communication of information between the first distribution node and the second distribution node based on data traffic requirements of the first distribution node, wherein the second distribution node receives the proposed bandwidth allocation schedule, and wherein the second distribution node adjusts the proposed bandwidth allocation schedule based upon data traffic requirements of the second distribution node. The first distribution node further operates to receive the adjusted proposed bandwidth allocation schedule from the second distribution node, and communicate information with the second distribution node according to the adjusted proposed bandwidth allocation schedule.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for dynamic bandwidth allocation of wireless mesh networks. At least some embodiments include distribution nodes of a wireless mesh network determining bandwidth allocation scheduling of communication between the distribution nodes using negotiated messages that are communicated between the distribution nodes.

Figure 1:
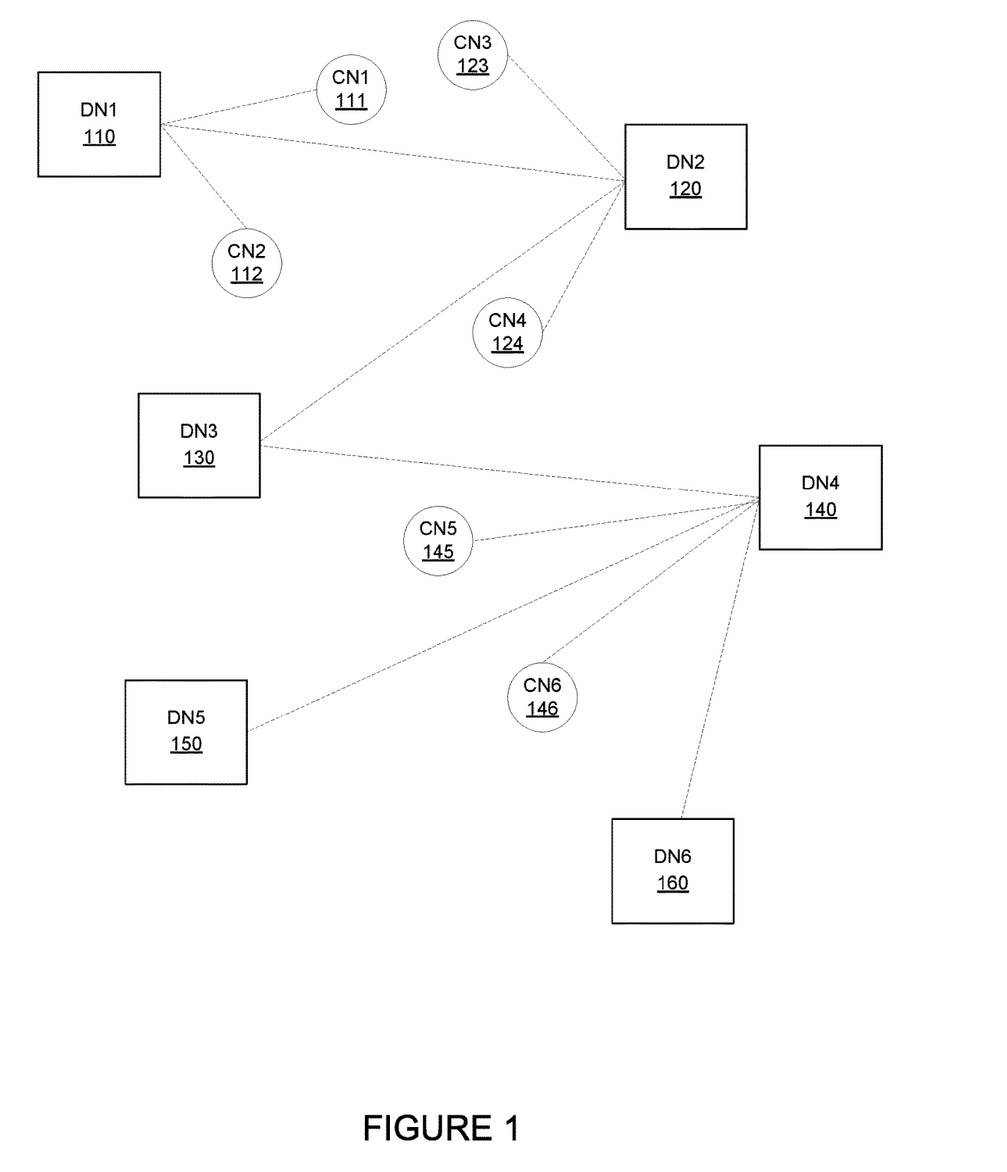
FIG. 1 shows nodes of a wireless mesh network, according to an embodiment.

FIG. 1 shows nodes of a wireless mesh network, according to an embodiment. As shown, the wireless mesh network includes distribution nodes 110, 120, 130, 140, 150, 160 and client nodes 111, 112, 123, 124, 145, 146. Distribution nodes may or may not include client nodes. Further, the distribution nodes 110, 120, 130, 140, 150, 160 operate to distribute wireless information to other distribution nodes and/or to client nodes. The client nodes 111, 112, 123, 124, 145, 146 are endpoint edge devices that generally originate or consume information. At least some of the described embodiments provide coordination and control of the transmission and reception of the information communicated between the nodes of the wireless mesh network.

Figure 2:
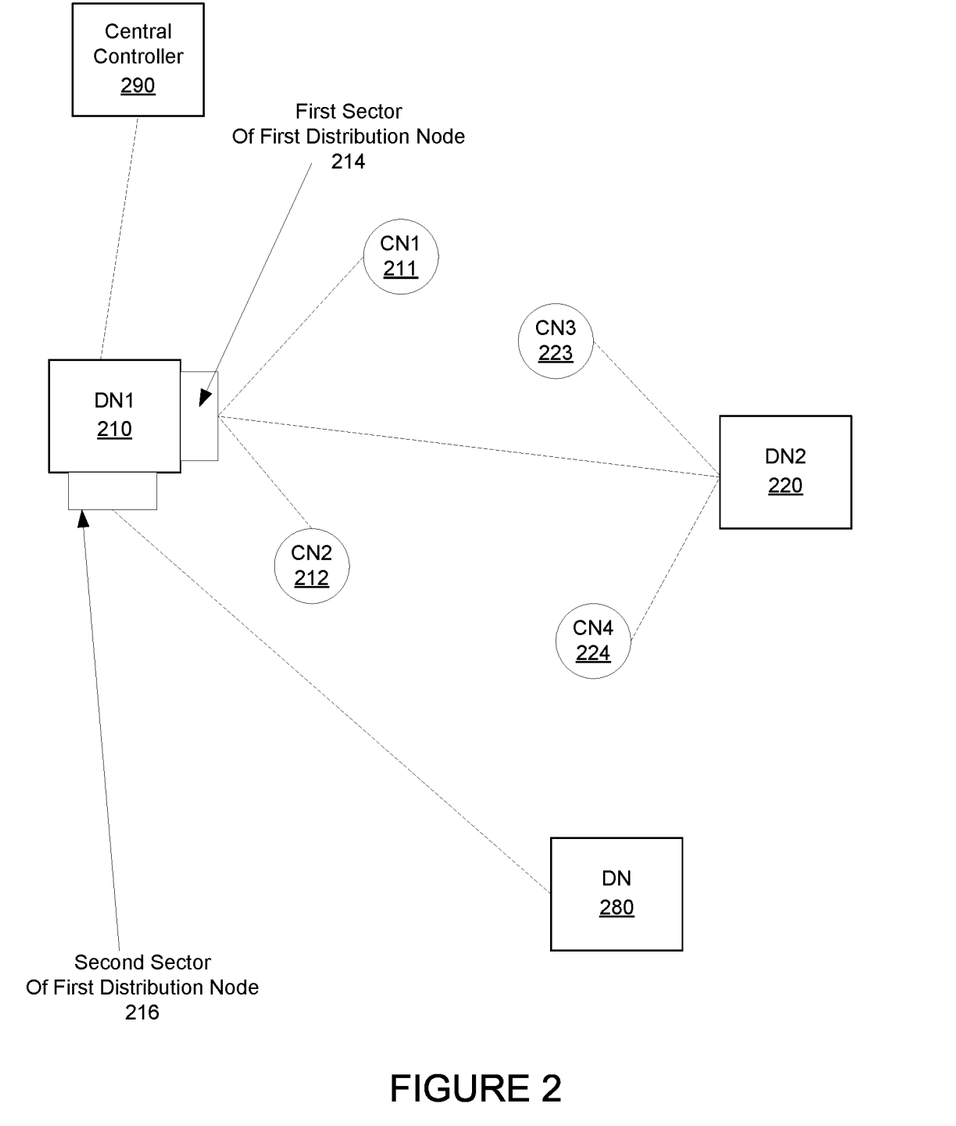
FIG. 2 shows distribution nodes and client nodes of a wireless mesh network, according to an embodiment.

FIG. 2 shows distribution nodes 210, 220 and client nodes 211, 212, 223, 224 of a wireless mesh network, according to an embodiment. For an embodiment, a first distribution node 210 operates to identify a communication link with a second distribution node 220 of the wireless mesh network. For an embodiment, identification of the communication link is provided to the first distribution node. For an embodiment, an upstream controller provides the identification of the communication link to the first distribution node. For an embodiment, first distribution node is further provided with the type of node (distribution node or client node) at the other end of the communication link. For an embodiment, the first distribution node operates to self-determine the identification of the communication link to the second distribution node.

For an embodiment, the first distribution node 210 further operates to generate a proposed bandwidth allocation schedule for wireless communication of information between the first distribution node and the second distribution node based on data traffic requirements of the first distribution node from its connected distribution nodes and client nodes. For an embodiment, the proposed bandwidth allocation schedule includes time allocations. For an embodiment, the proposed bandwidth allocation schedule includes frequency allocations. For an embodiment, the proposed bandwidth allocation schedule includes time and frequency allocations.

For at least some embodiments, the data traffic requirements of the first distribution node 210 are dependent on the demands of the nodes that are linked to the first distribution node 210. That is, as shown, the second distribution node 220 and client nodes 211, 212 all have data traffic demands to be satisfied by the first distribution node 210. For an embodiment, the proposed bandwidth allocation schedule reflects the data traffic demands of each of the linked nodes.

For at least some embodiments, the data traffic demand of each of the linked nodes is based at least in part on bandwidth requirements of the linked node. For an embodiment, each linked node, whether the linked node is a distribution node or a client node, reports the bandwidth requirements to the corresponding distribution node. For an embodiment, the bandwidth requirements includes a number of bytes pending for transmission to the corresponding linked node, and/or an arrival rate in terms of incoming bytes or packets per second, and/or a link rate (for example, MCS (modulation and coding scheme). For an embodiment, the first distribution node determines the a number of bytes pending for transmission to the corresponding linked node, and/or an arrival rate in terms of incoming bytes or packets per second as the bytes or packets are received at the first distribution node for transmission to the connecting nodes.

For at least some embodiments, the first distribution node communicates to the second distribution node its own bandwidth requirement (as previously defined) for the second distribution node, which the second distribution node uses for adjusting the proposed bandwidth allocation schedule. Further, the first distribution node determines the bandwidth requirements for outgoing traffic to all of the nodes linked to the first distribution node.

For at least some embodiments, the second distribution node 220 receives the proposed bandwidth allocation schedule from the first distribution node 210. Further, for at least some embodiments, the second distribution node 220 adjusts the proposed bandwidth allocation schedule based upon data traffic requirements of the second distribution node 220. As shown, the second distribution node 220 includes connections to the first distribution node 210 and client nodes 223, 224. Accordingly, at least some embodiments of the scheduling are based on data traffic demands of the e linked nodes 223, 224. For at least some embodiments, the data traffic demands of these linked nodes is based at least in part on queue sizes and traffic rates requested by the linked nodes.

As previously stated, the data traffic demand of each of the linked nodes is based at least in part on bandwidth requirements of the linked node. For an embodiment, each linked node, whether the linked node is a distribution node or a client node, reports the bandwidth requirements to the corresponding distribution node. For an embodiment, the bandwidth requirements includes a number of bytes pending for transmission to the corresponding linked node, and/or an arrival rate in terms of incoming bytes or packets per second, and/or the link rate (for example, MCS). For an embodiment, the second distribution node determines the number of bytes pending for transmission to the corresponding linked node, and/or an arrival rate in terms of incoming bytes or packets per second, and/or the link rate (for example, MCS) as the bytes or packets are received at the second distribution node for transmission to the connecting nodes.

For at least some embodiments, the second distribution node 220 communicates the adjusted proposed bandwidth allocation schedule to the first distribution node 210. The adjusted proposed bandwidth allocation schedule is then used for communicating information between the first distribution node and the second distribution node.

For at least some embodiments, each of the distribution nodes performs the above-described operations of the first distribution node. That is, each of the distribution nodes generates a proposed bandwidth allocation schedule which is communicated to all corresponding distribution node(s). Each distribution node then receives back an adjusted proposed bandwidth allocation schedule from all corresponding distribution node(s) which is used as the schedule for communicating between the distribution node and the other distribution node(s). Accordingly, each of the distribution nodes is also receiving a proposed bandwidth allocation schedule which the distribution node adjusts and communicates back. For an embodiment, the proposed bandwidth allocation schedule generated by the first distribution node is for transmit traffic (at the first distribution node), and the proposed bandwidth allocation schedule adjusted by the second distribution node is for receive traffic (at the second distribution node).

For at least some embodiments, the proposed bandwidth allocation schedule and the adjusted proposed bandwidth allocation schedule are communicated between the first distribution node and the second distribution node through a negotiated message. For an embodiment, the negotiated message is included within keep alive messages that are communicated between the distribution nodes. For an embodiment, a default bandwidth allocation schedule is used if the negotiated message exchange fails.

For at least some embodiments, after the proposed bandwidth allocation schedule and the adjusted proposed bandwidth allocation schedule have been communicated between the first distribution node 210 and the second distribution node 220, the first distribution node 210 then allocates at least a portion of available bandwidth allocations of the adjusted proposed bandwidth allocation schedule to client nodes of the first distribution node based on data traffic requirements of the client nodes. That is, the proposed bandwidth allocation schedule and the adjusted proposed bandwidth allocation schedule may not allocate all of the available bandwidth allocation. For an embodiment, at least a portion of remaining available bandwidth that has not been allocated is allocated to the client nodes linked to the first distribution node.

For an embodiment, the data traffic requirement of each client node is based at least in part on bandwidth requirements of the client node. For an embodiment, the bandwidth requirements include a number of bytes pending for transmission to the corresponding linked distribution node, and/or an arrival rate in terms of incoming bytes or packets per second, and/or the link rate. For an embodiment, the client node determines the link rate, and/or the number of bytes pending for transmission to the corresponding linked distribution node, and/or an arrival rate in terms of incoming bytes or packets per second as the bytes or packets are received at the client node for transmission to the connecting nodes.

For at least some embodiment, the bandwidth allocations are time allocations. For at least some embodiments, the proposed bandwidth allocation schedule includes a proposed bitmap of suggested bandwidth allocations (time allocations). The second distribution node then adjusts the bitmap, strictly as a subset of proposed bitmap, based on the data traffic demands of the second distribution node. That is, for at least some embodiments, the proposed bandwidth allocation includes the proposed bitmap, and the adjusted proposed bandwidth allocation includes the adjusted proposed bit map.

For at least some embodiments, the proposed bandwidth allocation schedule includes a percentage of an entire bit map, but does not include suggested bandwidth allocations of the bit map. That is, rather that specifying specific allocations of the available band allocations of the schedule, a percentage of the bandwidth allocations is specified. The second distribution node then adjusts the percentage to be equal or lower based on the data traffic demands of the second distribution node. For an embodiment, the proposed bandwidth allocation schedule includes a percentage of an entire bit map when the number of distribution nodes linked to the first distribution node is not greater than two.

For at least some embodiments, the proposed bandwidth allocation schedule distributes the bandwidth allocations across the bit map. Distributing the bandwidth allocations across the bitmap can improve latency. That is, for example, evenly distributing the bandwidth allocations across the bitmap can provide better latency and jitter performance of communication between the first distribution node and the second distribution node compared to distributing the bandwidth allocations in only one portion of the bitmap.

For at least some embodiments, the proposed bandwidth allocation schedule includes control slots, wherein communication of information cannot be scheduled during the control slots. For an embodiment, the information within the control slots includes wireless network control information.

For an embodiment, the locations of the control slots remain the same during or over an association time between peer distribution nodes, such as, the first distribution node and the second distribution node. However, for an embodiment, the locations of the control slots within the bandwidth allocation schedule can change over different associations.

For at least some embodiments, placement of the control slots for each link of the distribution node of the wireless mesh network is different than other links of the distribution node. That is, the control slot of each link of the distribution node is exclusive. For an embodiment in the Z street case, an upstream controller selects/allocates the placements of the control slots to prevent conflicts between different links of the same distribution node.

FIG. 2 further shows a first sector 214 of the first distribution node 210 and a second sector 216 of the first distribution node 210. For at least some embodiments, each sector 214, 216 includes a radio. As described, a communication link is identified with the second distribution node 220 of the wireless mesh network. For an embodiment, this communication link is through the first sector 214 of the first distribution node 210. For an embodiment, a communication (second or different) link is identified with another distribution node 280 of the wireless mesh network. For an embodiment, this communication link is through the second sector 216 of the first distribution node 210. Further, the described embodiments for generating and exchanging the proposed bandwidth allocation schedule and adjusted proposed bandwidth allocation schedule between the first distribution node 210 and the second distribution node 220 can additionally be performed between the first distribution node 210 and the other distribution node 280. That is, a first proposed bandwidth allocation schedule and a first adjusted proposed bandwidth allocation schedule are generated and exchanged between the first sector 214 of the first distribution node 210 and the second distribution node 220, and a second proposed bandwidth allocation schedule and a second adjusted proposed bandwidth allocation schedule are generated and exchanged between the second sector 216 of the first distribution node 210 and the other distribution node 280. Clearly, each distribution node can include any number of sectors, and generates and receives the corresponding number of proposed bandwidth allocation schedules and adjusted proposed bandwidth allocation schedules. For at least some embodiments, the scheduling of each of the sectors 214, 216 is independent of the scheduling of the other sector 214, 216.

FIG. 2 also shows a central or upstream controller 290. The controller 290 operates to provide at least some control information to the distribution node 210.

Figure 3:
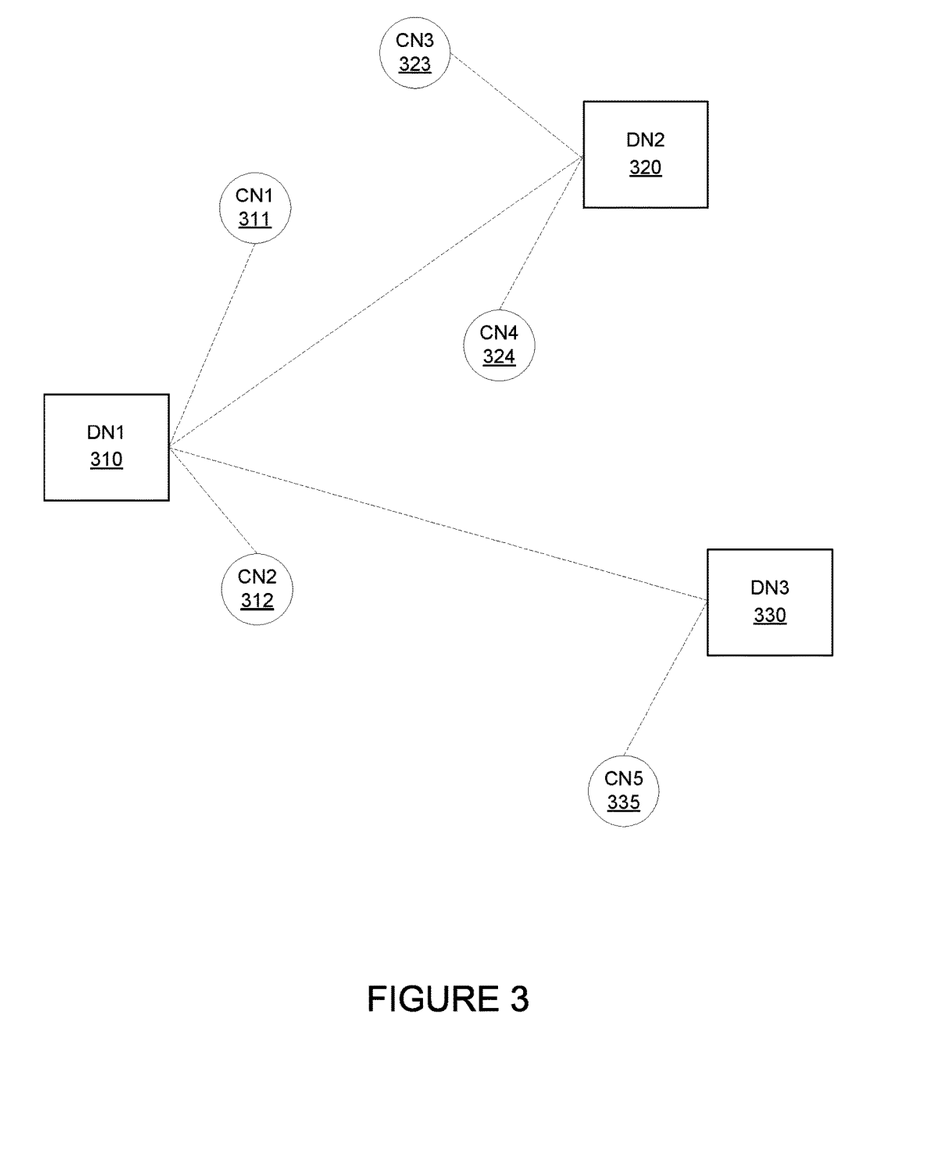
FIG. 3 shows a Y-street configuration of distribution nodes, according to an embodiment.

FIG. 3 shows a Y-street configuration of distribution nodes, according to an embodiment. As shown, the first distribution node 310 is linked to the second distribution node 320, and to a third distribution node 330. For at least some embodiments, the first distribution node 310 communicates proposed bandwidth allocation schedules to both the second distribution node 320 and the third distribution node 330. The first distribution node then receives back from both the second distribution node 320 and the third distribution node 330 adjusted proposed bandwidth allocation schedules.

Specifically, for an embodiment, the first distribution node 310 operates to generate a proposed bandwidth allocation schedule for the second distribution node 320 based on data traffic requirements of the first distribution node 310, and receives back an adjusted bandwidth allocation schedule from the second distribution node 320. Further, the first distribution node 310 of a wireless mesh network identifies a communication link with the third distribution node 330 of the wireless mesh network. The first distribution node 310 further operates to generate a proposed bandwidth allocation schedule for wireless communication of information between the first distribution node 310 and the third distribution node 330 based on data traffic requirements of the first distribution node 310. For an embodiment, the data traffic requirements of the first distribution node 310 is determined based on traffic requirements of nodes linked to the first distribution node, such as, distribution nodes 320, 330 and client nodes 311, 312. For an embodiment, the data traffic requirements of the second distribution node 320 is determined based on traffic requirements of nodes linked to the second distribution node 320, such as, distribution nodes 310 and client nodes 323, 324.

For at least some embodiments, the third distribution node 330 receives the proposed bandwidth allocation schedule and adjusts the proposed bandwidth allocation schedule based upon data traffic requirements of the third distribution node 330. The first distribution node 310 receives the adjusted proposed bandwidth allocation schedule from the third distribution node 330, and communicates information with the second distribution node 320 and the third distribution 330 according to the adjusted proposed bandwidth allocation schedule of the second distribution node 320 and the adjusted proposed bandwidth allocation schedule of the third distribution node 330. For an embodiment, the data traffic requirements of the third distribution node 330 is determined based on data traffic requirements of nodes linked to the third distribution node 330, such as, distribution nodes 310 and client node 335. It is to be understood that the second distribution node 320 and the third distribution node 330 generate proposed bandwidth allocation schedules as well, and the first distribution node receives these proposed bandwidth allocation schedules, adjusts the proposed bandwidth allocation schedules (based on the data traffic requirements of the first distribution node 310), and communicates the adjusted schedules back to the second distribution node 320 and the third distribution node 330.

Figure 4:
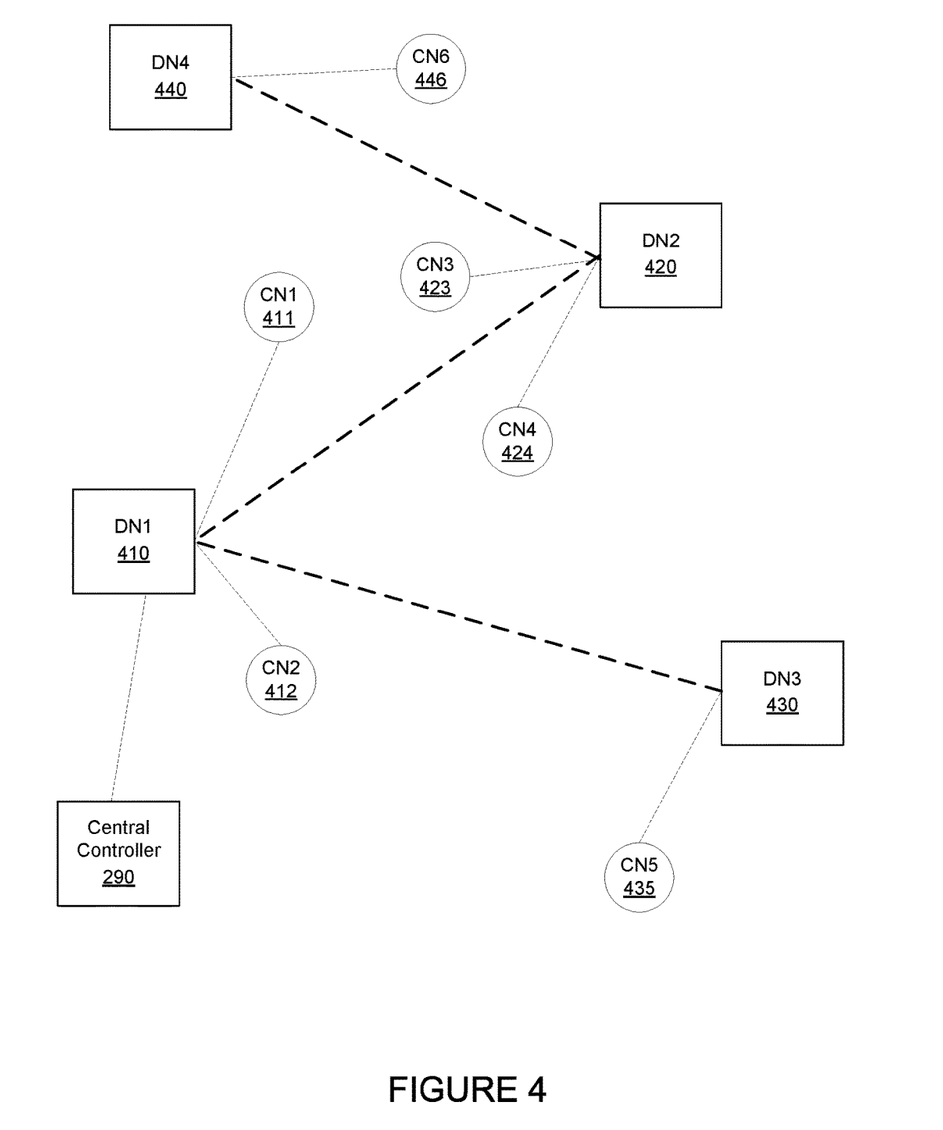
FIG. 4 shows a Z-street configuration of distribution nodes, according to an embodiment.

FIG. 4 shows a Z-street configuration of distribution nodes, according to an embodiment. As shown, the first distribution node 410 is linked to the second distribution node 420 and the third distribution node 430. Further, the second distribution node 420 is linked to the first distribution node 410 and a fourth distribution node 440. This configuration includes the formation of a Z by the links between the fourth distribution node 440, the second distribution node 420, the first distribution node 410, and the third distribution node 430. Further, the first distribution node includes client nodes 411, 412, the second distribution node includes client nodes 423, 424, the third distribution node 430 includes client node 435, and the fourth distribution node 440 includes client node 446.

Accordingly, at least some embodiments include identifying that the first distribution node and the second distribution node have a link between each other, the first distribution node has another link within a third distribution node, and the second distribution node has another link with a fourth distribution node. That is, a Z-street configuration is identified.

For at least some embodiments, once the Z-street configuration has been identified, the first distribution node 410 and the second distribution node 420 are provided with priority zones. For at least some embodiment, a priority zone provided to the first distribution node 410 identifies portions of the proposed bandwidth allocation schedule that can be allocated to each of the distribution nodes the first distribution node 410 is linked to. Further, a priority zone provided to the second distribution node 420 identifies portions of the proposed bandwidth allocation schedule that can be allocated to each of the distribution nodes the second distribution node 410 is linked to. The priority zones are provided to prevent conflicts in the scheduling.

For at least some embodiments, the first distribution node 410 generates the proposed bandwidth allocation schedule according to its provided priority zone. For at least some embodiments, the second distribution 420 node generates the adjusted time slot schedule according to its provided priority zone.

For a specific Z-street configuration, the first distribution node 410 is only linked to the second distribution node 420 and the third distribution node 430, and the second distribution node 420 is only linked to the first distribution node 410 and the fourth distribution node 440, and wherein the first distribution node 410 and the second distribution nodes 420 are provided with binary priority zones. That is, as previously described, the distribution nodes can be linked to any number of other distribution nodes. However, for this specific configuration, the first distribution node is only linked to two other distribution nodes, and the second distribution nodes is only linked to two other distribution nodes. For this specific configuration, the priority zones are binary.

That is, a first priority zone of the first distribution node allocates bandwidth allocations within the first priority zone that is a binary of a second priority zone of the second distribution node that allocates bandwidth allocations within the second priority zone. The first priority zone and the second priority zone are selected to prevent conflicts between the communication of the first distribution node and the second distribution node. That is, for an embodiment, the first priority zone and the second priority zone are mutually exclusive, and do not overlap.

For an embodiment, an upstream controller (such as previously described upstream or central controller 290) operates to identify that the first distribution node and the second distribution node have the link between each other, the first distribution node has the other link with the third distribution node, and the second distribution node has the other link with the fourth distribution node. Further, for an embodiment, the upstream controller provides all the distribution nodes with priority zones.

Figure 5:
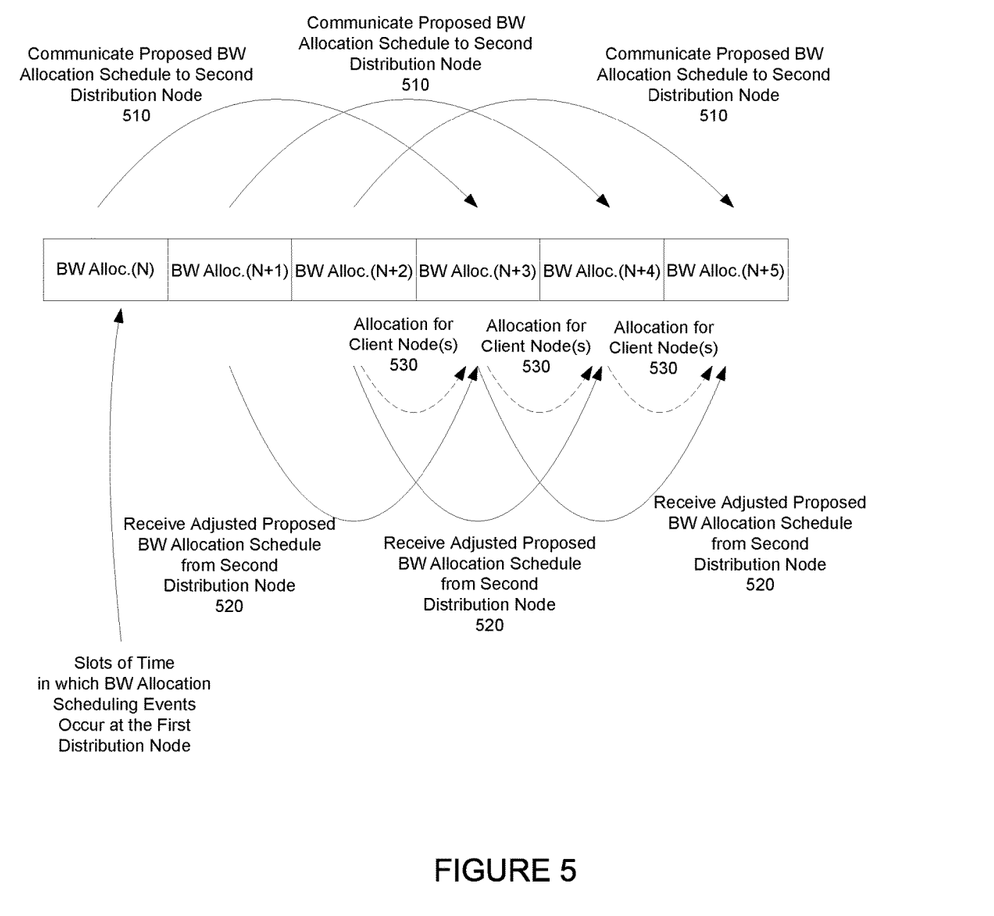
FIG. 5 shows a sequence of bandwidth allocation scheduling actions occurring at a distribution node, according to an embodiment.

FIG. 5 shows a sequence of bandwidth allocation scheduling actions occurring at a distribution node (for example, at the first distribution node), according to an embodiment. Each block of the sequence designates actions of the distribution node. A first action 510 of the distribution node includes generating and communicating the proposed bandwidth allocation schedule to one or more peer distribution nodes (such as, the second distribution node). A second action 520 includes the distribution node responding to a proposed bandwidth allocation schedule received from a peer node with an adjusted proposed bandwidth allocation schedule. A third action 530 generating and communicating a bandwidth allocation schedule with one or more client nodes linked to the distribution node.

The sequence of actions of the distribution node of FIG. 5 illuminates that each of the distribution nodes of the wireless mesh network are performing the described operations of generating proposed bandwidth allocation schedules and adjusting received proposed bandwidth allocation schedules.

Figure 6:
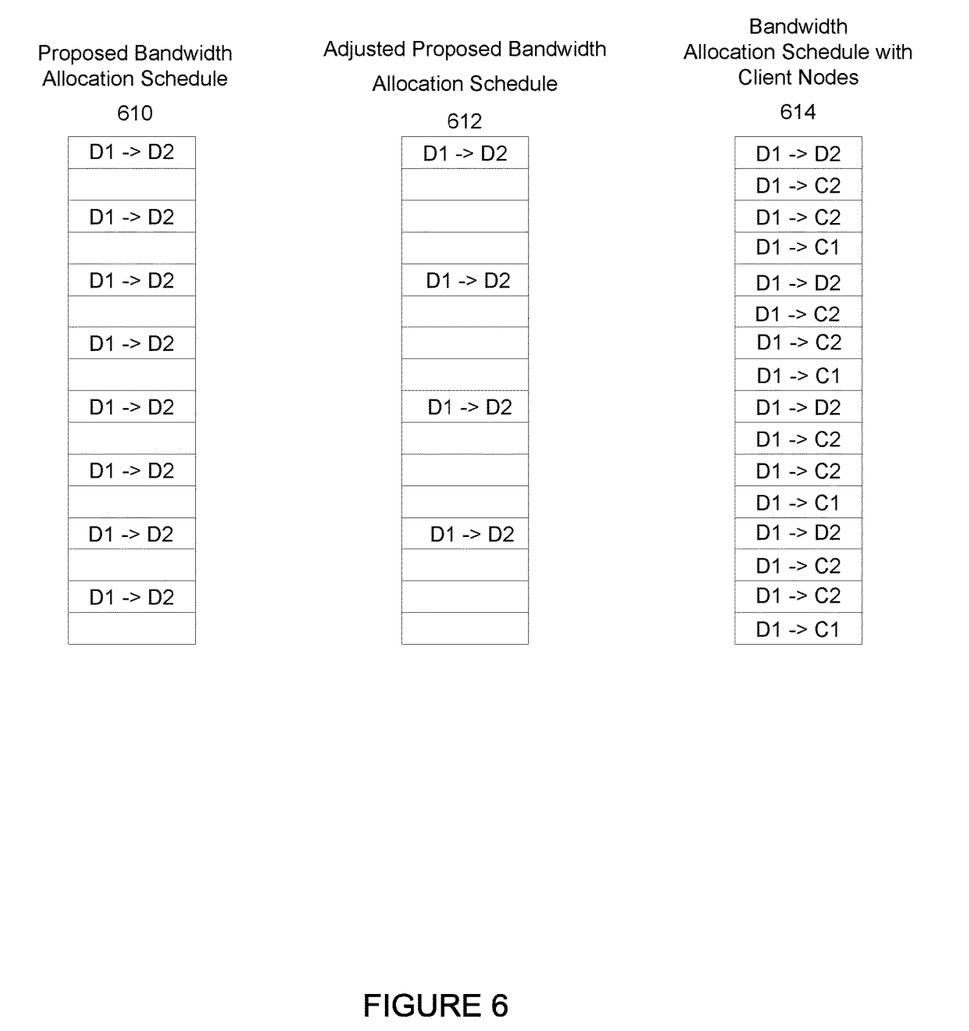
FIG. 6 shows a proposed bandwidth allocation schedule, an adjusted proposed bandwidth allocation schedule, and a final bandwidth allocation schedule, according to an embodiment.

FIG. 6 shows a proposed bandwidth allocation schedule, an adjusted proposed bandwidth allocation schedule, and a final bandwidth allocation schedule, according to an embodiment. The bandwidth allocation schedules suggest time slots, but as previously described, the bandwidth allocations can be time and/or frequency allocations. The proposed bandwidth allocation schedule 610 is generated by the first distribution node and communicated to the second distribution node, wherein the proposed bandwidth allocation schedule 610 is generated based on data traffic requirements of the first distribution node. As previously described, the second distribution node receives the proposed bandwidth allocation schedule 610, and the second distribution node generates an adjusted proposed bandwidth allocation schedule 612 based on the proposed bandwidth allocation schedule 610 and based upon data traffic requirements of the second distribution node. Further, for at least some embodiments, the first distribution node receives the proposed bandwidth allocation schedule 612 and generates a final bandwidth allocation schedule 614 by allocating at least a portion of available bandwidth allocations of the adjusted proposed bandwidth allocation schedule to client nodes of the first distribution node based on data traffic requirements of the client nodes. The first distribution node then communicates information with the second distribution node and the client nodes according to the final bandwidth allocation schedule.

Figure 7:
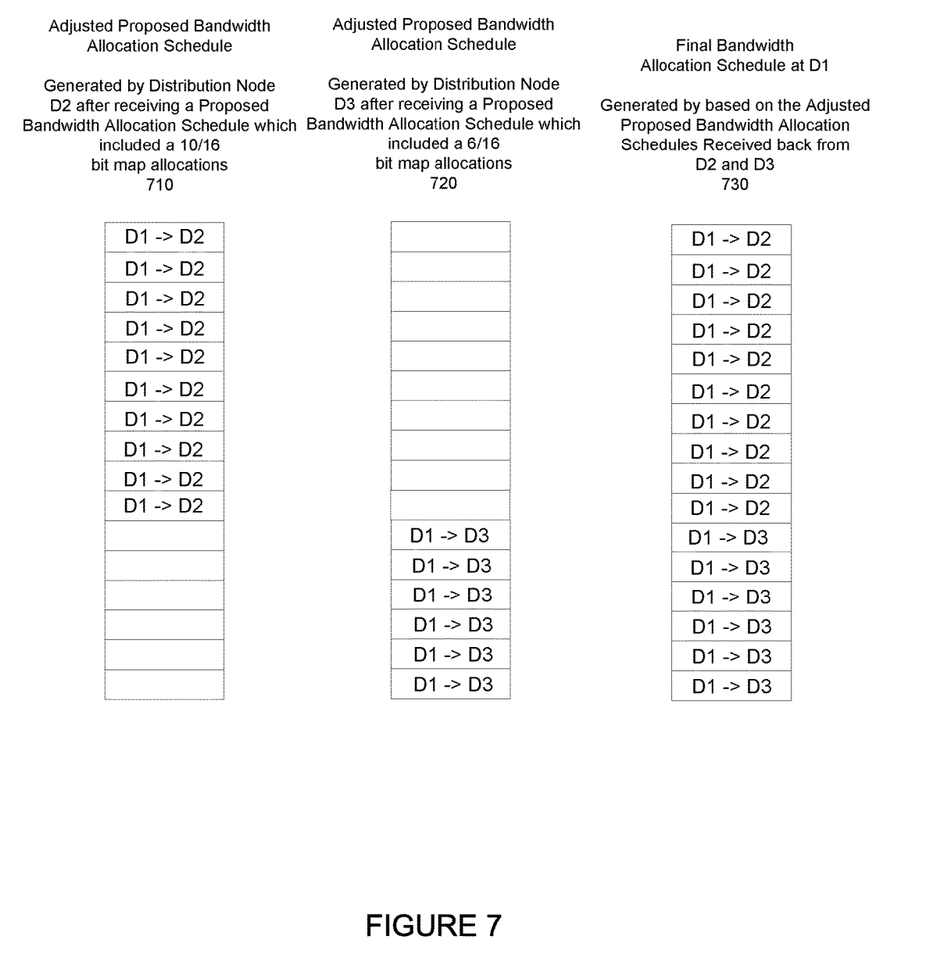
FIG. 7 shows adjusted proposed bandwidth allocation schedules of a second distribution node and a third distribution node in response to a propose bandwidth allocation of a first distribution node, and a final bandwidth allocation schedule, according to an embodiment.

FIG. 7 shows adjusted proposed bandwidth allocation schedules of a second distribution node and a third distribution node in response to a propose bandwidth allocation of a first distribution node, and a final bandwidth allocation schedule, according to an embodiment. For the adjusted proposed bandwidth allocation schedules of FIG. 7, each of the second distribution node and the third distribution node receives a proposed bandwidth allocation schedules includes a ratio or percentage rather than specific allocations. The second and third distribution nodes then generate the adjusted proposed bandwidth allocation schedules 710, 720 based on the provided ratio or percentage, and based upon their data traffic requirements. As shown in FIG. 7, the second distribution node was provided with a ratio or percentage of 10/16, 5/8, or 62.5%, and the third distribution node was provided with a ratio or percentage of 6/16, 3/8, or 37.5%.

For at least some embodiments, after receiving the adjusted proposed bandwidth allocation schedules of a second distribution node and a third distribution node, the first distribution node generates a final bandwidth allocation schedule 730.

Figure 8:
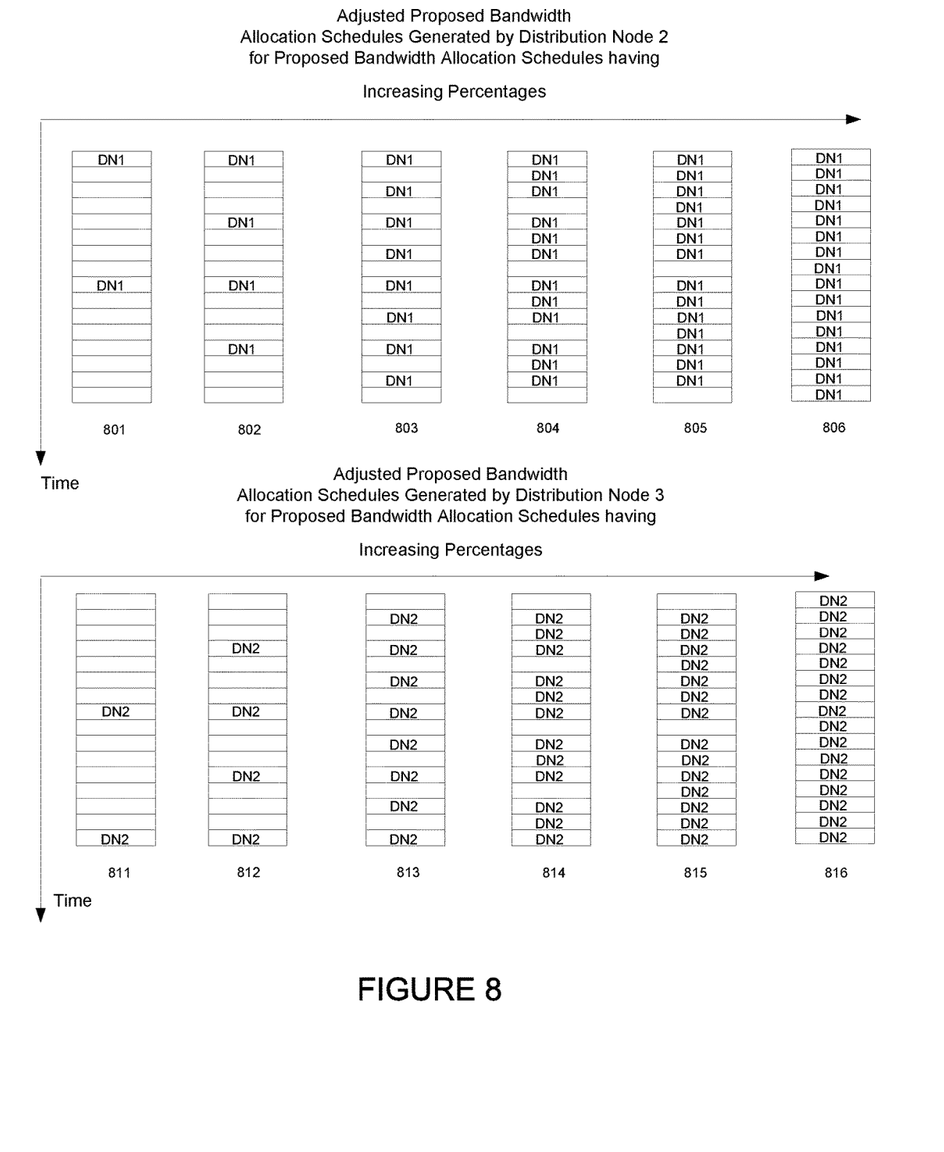
FIG. 8 shows a series of adjusted proposed bandwidth allocation schedules of a second distribution node and a third distribution node, wherein the allocations are distributed according to different percentages, according to an embodiment.

FIG. 8 shows a series of adjusted proposed bandwidth allocation schedules of a second distribution node and a third distribution node, wherein the allocations are distributed according to different percentages, according to an embodiment. As previously described, distributing the allocations rather than concentrating the allocations can result in better latency and jitter performance of wireless communication through the distribution nodes.

The adjusted proposed bandwidth allocation schedules 801, 802, 803, 804, 805, 806 are generated by the second distribution node in response to proposed bandwidth allocation schedules having increasingly greater percentages or ratios. As shown, the allocations are distributed somewhat evenly across available slots.

The adjusted proposed bandwidth allocation schedules 811, 812, 813, 814, 815, 816 are generated by the third distribution node in response to proposed bandwidth allocation schedules having increasingly greater percentages or ratios. As shown, the allocations are distributed somewhat evenly across available slots.

For at least some embodiments, the first distribution node receives the adjusted proposed bandwidth allocation schedule (that is, one of the bandwidth allocation schedules 801, 802, 803, 804, 805, 806) generated by the second distribution node, and the first distribution node receives the adjusted proposed bandwidth allocation schedule (that is, one of the bandwidth allocation schedules 811, 812, 813, 814, 815, 816) generated by the third distribution node. The first distribution node integrates the bandwidth allocation generated by the second distribution node and the bandwidth allocation generated by third distribution node. Note that the combination of the bandwidth allocation generated by the second distribution node and the bandwidth allocation generated by third distribution node can only add up to at most 100% of the bit map, not more. That is, more slots than are allowable by the bit map cannot be allocated to the second distribution node and the third distribution node.

Figure 9:
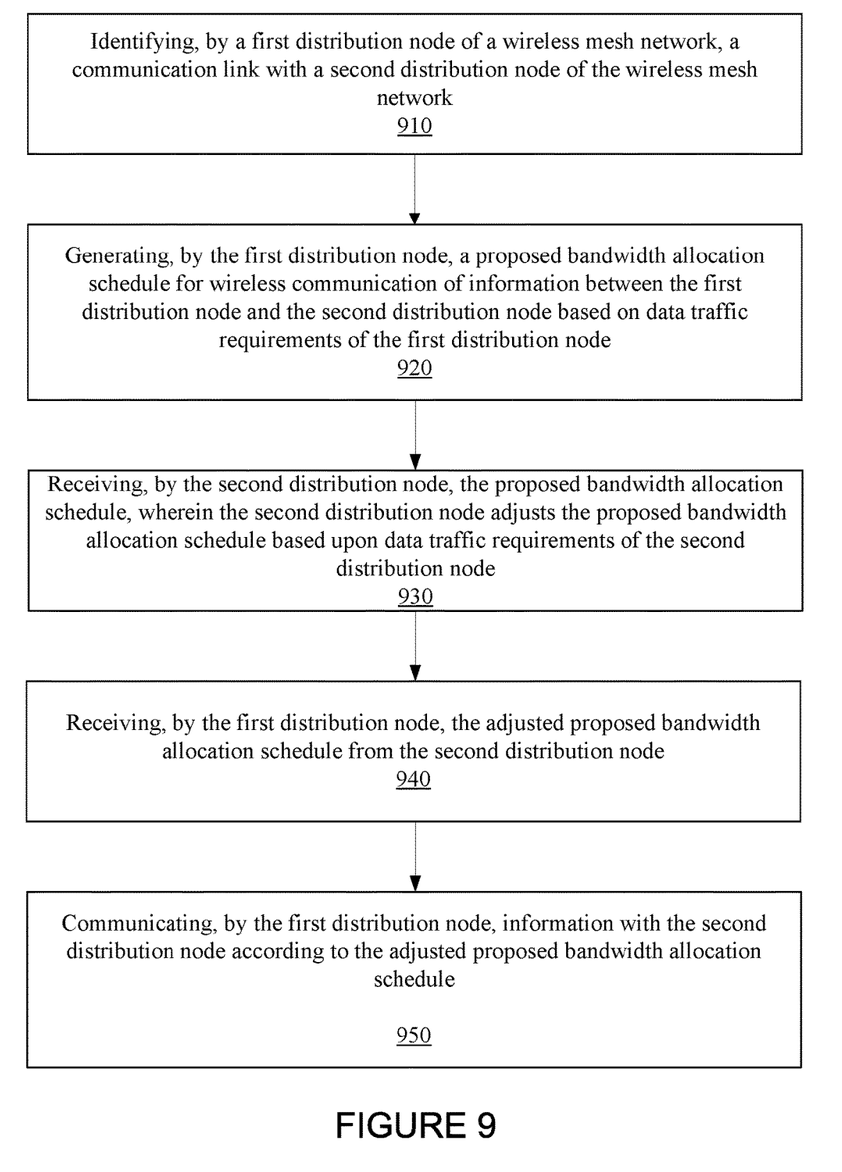
FIG. 9 is a flow chart that includes steps of a method of dynamic bandwidth allocation for a wireless mesh network, according to an embodiment.

FIG. 9 is a flow chart that includes steps of a method of dynamic bandwidth allocation for a wireless mesh network, according to an embodiment. A first step 910 includes identifying, by a first distribution node of a wireless mesh network, a communication link with a second distribution node of the wireless mesh network. A second step 920 includes generating, by the first distribution node, a proposed bandwidth allocation schedule for wireless communication of information between the first distribution node and the second distribution node based on data traffic requirements of the first distribution node. A third step 930 includes the second distribution node receiving the proposed bandwidth allocation schedule, wherein the second distribution node adjusts the proposed bandwidth allocation schedule based upon data traffic requirements of the second distribution node. A fourth step 940 includes receiving, by the first distribution node, the adjusted proposed bandwidth allocation schedule from the second distribution node. A fifth step 950 includes communicating, by the first distribution node, information with the second distribution node according to the adjusted proposed bandwidth allocation schedule.

For an embodiment, the proposed bandwidth allocation schedule and the adjusted proposed bandwidth allocation schedule are communicated between the first distribution node and the second distribution node through a negotiated message. For an embodiment, the negotiated message is included within keep alive messages, which are communicated between the distribution nodes.

As previously described, at least some embodiments further include allocating, by the first distribution node, at least a portion of available bandwidth allocations of the adjusted proposed bandwidth allocation schedule to client nodes of the first distribution node based on data traffic requirements of the client nodes.

For at least some embodiments, the data traffic demand of each of the linked nodes (distribution nodes and/or client nodes) is based at least in part on bandwidth requirements of the linked node. For an embodiment, each linked node, whether the linked node is a distribution node or a client node, reports the bandwidth requirements to the corresponding distribution node. For an embodiment, the bandwidth requirements includes a number of bytes pending for transmission to the corresponding linked node, an arrival rate in terms of incoming bytes or packets per second, and/or a link rate (MCS). For an embodiment, the first distribution node determines the a number of bytes pending for transmission to the corresponding linked node, and/or an arrival rate in terms of incoming bytes or packets per second as the bytes or packets are received at the first distribution node for transmission to the connecting nodes.

As previously described, at least some embodiments further include identifying, by the first distribution node of the wireless mesh network, a communication link with a third distribution node of the wireless mesh network. The communication links between the first distribution node and the second distribution node, and between the first distribution node and the third distribution node for a Y-street configuration. At least some embodiments further include generating, by the first distribution node, a proposed bandwidth allocation schedule for wireless communication of information between the first distribution node and the third distribution node based on data traffic requirements of the first distribution node, wherein the third distribution node receives the proposed bandwidth allocation schedule, and wherein the third distribution node adjusts the proposed bandwidth allocation schedule based upon data traffic requirements of the third distribution node, receiving, by the first distribution node, the adjusted proposed bandwidth allocation schedule from the third distribution node, and communicating, by the first distribution node, information with the second distribution node and the third distribution according to the adjusted proposed bandwidth allocation schedule of the second distribution node and the adjusted proposed bandwidth allocation schedule of the third distribution node.

As previously described, for at least some embodiments, the proposed bandwidth allocation schedule includes a percentage of an entire bit map, but does not include suggested bandwidth allocations of the entire bit map.

As previously described, for at least some embodiments, the proposed bandwidth allocation schedule distributes the bandwidth allocations across the proposed bandwidth allocation schedule (bit map). As previously described, and shown in FIG. 8, distributing the bandwidth allocations across the schedule can improve latency. That is, for example, evenly distributing the bandwidth allocations across the schedule can provide better latency and jitter performance of communication between the first distribution node and the second distribution node compared to distributing the bandwidth allocations in only one portion of the schedule.

As previously described, for at least some embodiments, the proposed bandwidth allocation schedule includes control slots, wherein communication of information cannot be scheduled during the control slots. The locations of the control slots within the proposed bandwidth allocation schedule can change over time. However, the locations of the control slots remain the same during or over an association time with peer distribution nodes.

As previously described, for at least some embodiments, placement of the control slots for each link of the first distribution node to other distribution nodes and client nodes of the wireless mesh network is different than other links of the first distribution node to the other distribution nodes and the client nodes. That is, the control slot of each link of the distribution node is exclusive and does not overlap with placement of the control slot of other link of the distribution node.

For an embodiment, an upstream controller selects/allocates the placements of the control slots to prevent conflicts between different links of the same distribution node.

An embodiment includes identifying a Z-street distribution node configuration. Specifically, an embodiment includes identifying that the first distribution node and the second distribution node have a link between each other, the first distribution node has another link within a third distribution node, and the second distribution node has another link with a fourth distribution node. Further, at least some embodiments include providing the first distribution node and the second distribution node with priority zones, wherein the first distribution node generates the proposed bandwidth allocation schedule according to its provided priority zone, and the second distribution node generates the adjusted bandwidth allocation schedule according to its provided priority zone.

For a specific Z-street configuration, the first distribution node is only linked to the second distribution node and the third distribution node, and the second distribution node is only linked to the first distribution node and the fourth distribution node, and wherein the first distribution node and the second distribution nodes are provided with binary priority zones. For an embodiment, a first priority zone of the first distribution node allocates bandwidth allocations within the first priority zone that is a binary of a second priority zone of the second distribution node that allocates bandwidth allocations within the second priority zone. That is, the control slot of each link of the distribution node is exclusive. The first priority zone and the second priority zone are selected to prevent conflicts between the communication of the first distribution node and the second distribution node.

For an embodiment, an upstream controller operates to identify that the first distribution node and the second distribution node have the link between each other, the first distribution node has the other link within the third distribution node, and the second distribution node has the other link with the fourth distribution node, and the upstream controller provides the first distribution node and the second distribution node with priority zones.

Although specific embodiments have been described and illustrated, the embodiments are not to be limited to the specific forms or arrangements of parts so described and illustrated. The described embodiments are to only be limited by the claims.

What is claimed:

1. A method, comprising:
   identifying, by a first distribution node of a wireless mesh network, a communication link with a second distribution node of the wireless mesh network;
   generating, by the first distribution node, a proposed bandwidth allocation schedule for wireless communication of information between the first distribution node and the second distribution node based on data traffic requirements of the first distribution node;
   wherein the second distribution node receives the proposed bandwidth allocation schedule, and wherein the second distribution node adjusts the proposed bandwidth allocation schedule based upon data traffic requirements of the second distribution node;
   receiving, by the first distribution node, the adjusted proposed bandwidth allocation schedule from the second distribution node; and
   communicating, by the first distribution node, information with the second distribution node according to the adjusted proposed bandwidth allocation schedule.

2. The method of claim 1, further comprising:
   allocating, by the first distribution node, at least a portion of available bandwidth allocations of the adjusted proposed bandwidth allocation schedule to client nodes of the first distribution node based on data traffic requirements of the client nodes.

3. The method of claim 1, further comprising:
   identifying, by the first distribution node of the wireless mesh network, a communication link with a third distribution node of the wireless mesh network;
   generating, by the first distribution node, a proposed bandwidth allocation schedule for wireless communication of information between the first distribution node and the third distribution node based on data traffic requirements of the first distribution node;
   wherein the third distribution node receives the proposed bandwidth allocation schedule, and wherein the third distribution node adjusts the proposed bandwidth allocation schedule based upon data traffic requirements of the third distribution node;

receiving, by the first distribution node, the adjusted proposed bandwidth allocation schedule from the third distribution node; and communicating, by the first distribution node, information with the second distribution node and the third distribution according to the adjusted proposed bandwidth allocation schedule of the second distribution node and the adjusted proposed bandwidth allocation schedule of the third distribution node.

4. The method of claim 1, wherein the proposed bandwidth allocation schedule includes a percentage of a bit map, but does not include suggested bandwidth allocations of the bit map.

5. The method of claim 1, wherein the proposed bandwidth allocation schedule distributes bandwidth allocations across the proposed bandwidth allocation schedule.

6. The method of claim 1, wherein the proposed bandwidth allocation schedule includes control slots, wherein communication of information cannot be scheduled during the control slots.

7. The method of claim 6, wherein placement of the control slots for each link of the first distribution node to other distribution nodes and client nodes of the wireless mesh network is different than other links of the first distribution node to the other distribution nodes and the client nodes.

8. The method of claim 1, further comprising:
identifying that the first distribution node and the second distribution node have a link between each other, the first distribution node has another link within a third distribution node, and the second distribution node has another link with a fourth distribution node.

9. The method of claim 8, further comprising:
providing the first distribution node and the second distribution node with priority zones, wherein
the first distribution node generates the proposed bandwidth allocation schedule according to its provided priority zone; and
the second distribution node generates the adjusted bandwidth allocation schedule according to its provided priority zone.

10. The method of claim 9, wherein the first distribution node is only linked to the second distribution node and the third distribution node, and the second distribution node is only linked to the first distribution node and the fourth distribution node, and wherein the first distribution node and the second distribution nodes are provided with binary priority zones.

11. The method of claim 9, wherein an upstream controller
identifies that the first distribution node and the second distribution node have the link between each other, the first distribution node has the other link within the third distribution node, and the second distribution node has the other link with the fourth distribution node; and
provides the first distribution node and the second distribution node with priority zones.

12. A wireless network, comprising:
a first distribution node;
a second distribution node;
wherein the first distribution node operates to:
identify a communication link with the second distribution node;
generate a proposed bandwidth allocation schedule for wireless communication of information between the first distribution node and the second distribution node based on data traffic requirements of the first distribution node;
wherein the second distribution node operates to:
receive the proposed bandwidth allocation schedule; and
adjust the proposed bandwidth allocation schedule based upon data traffic requirements of the second distribution node;
wherein the first distribution node further operates to:
receive the adjusted proposed bandwidth allocation schedule from the second distribution node; and
communicate information with the second distribution node according to the adjusted proposed bandwidth allocation schedule.

13. The wireless network of claim 12, wherein the first distribution node operates to:
allocate at least a portion of available bandwidth allocations of the adjusted proposed bandwidth allocation schedule to client nodes of the first distribution node based on data traffic requirements of the client nodes.

14. The wireless network of claim 12, wherein the first distribution node operates to:
identify a communication link with a third distribution node of the wireless mesh network;
generate a proposed bandwidth allocation schedule for wireless communication of information between the first distribution node and the third distribution node based on data traffic requirements of the first distribution node;
wherein the third distribution node receives the proposed bandwidth allocation schedule, and wherein the third distribution node adjusts the proposed bandwidth allocation schedule based upon data traffic requirements of the third distribution node;
receive the adjusted proposed bandwidth allocation schedule from the third distribution node; and
communicate information with the second distribution node and the third distribution according to the adjusted proposed bandwidth allocation schedule of the second distribution node and the adjusted proposed bandwidth allocation schedule of the third distribution node.

15. The wireless network of claim 12, wherein
the first distribution node and the second distribution node are identified to have a link between each other, the first distribution node is identified to have another link within a third distribution node, and the second distribution node is identified to have another link with a fourth distribution node.

16. The wireless network of claim 15, wherein
the first distribution node and the second distribution node are provided with priority zones, wherein
the first distribution node generates the proposed bandwidth allocation schedule according to its provided priority zone; and
the second distribution node generates the adjusted time slot schedule according to its provided priority zone.

17. The wireless network of claim 16, wherein the first distribution node is only linked to the second distribution node and the third distribution node, and the second distribution node is only linked to the first distribution node and the fourth distribution node, and wherein the first distribution node and the second distribution nodes are provided with binary priority zones.

18. The wireless network of claim 15, further comprising an upstream controller, wherein the upstream controller operates to:
- identify that the first distribution node and the second distribution node have the link between each other, the first distribution node has the other link within the third distribution node, and the second distribution node has the other link with the fourth distribution node; and
- provide the first distribution node and the second distribution node with priority zones.

19. The wireless network of claim 12, wherein the proposed bandwidth allocation schedule includes control slots, wherein communication of information cannot be scheduled during the control slots, wherein placement of the control slots for each distribution node of the wireless mesh network is different that at least one other distribution node.

20. A first distribution node operative to:
- identify a communication link with a second distribution node of a wireless mesh network;
- generate a proposed bandwidth allocation schedule for wireless communication of information between the first distribution node and the second distribution node based on data traffic requirements of the first distribution node;
- wherein the second distribution node receives the proposed bandwidth allocation schedule, and wherein the second distribution node adjusts the proposed bandwidth allocation schedule based upon data traffic requirements of the second distribution node;
- wherein the first distribution node further operates to:
- receive the adjusted proposed bandwidth allocation schedule from the second distribution node; and
- communicate information with the second distribution node according to the adjusted proposed bandwidth allocation schedule.

\* \* \* \* \*